United States Patent
Xiang (10) Patent No.: US 9,240,695 B2
(45) Date of Patent: Jan. 19, 2016

(54) USB CHARGER WITH ELECTRIC POWER DISPLAY AND A METHOD FOR ELECTRIC POWER DISPLAY

(71) Applicant: Zhiyong Xiang, Shenzhen (CN)

(72) Inventor: Zhiyong Xiang, Shenzhen (CN)

(73) Assignee: HUIZHOU KIMREE TECHNOLOGY CO., LTD. SHENZHEN BRANCH, Shenzhen (CN)

( * ) Notice: Subject to any disclaimer, the term of this patent is extended or adjusted under 35 U.S.C. 154(b) by 185 days.

(21) Appl. No.: 13/968,010

(22) Filed: Aug. 15, 2013

(65) Prior Publication Data
US 2014/0375249 A1    Dec. 25, 2014

(30) Foreign Application Priority Data
Jun. 24, 2013  (CN) .......................... 2013 1 0254475

(51) Int. Cl.
*H02J 7/00*   (2006.01)
(52) U.S. Cl.
CPC ......... *H02J 7/0047* (2013.01); *H02J 2007/005* (2013.01); *H02J 2007/0062* (2013.01)

(58) Field of Classification Search
None
See application file for complete search history.

(56) References Cited

U.S. PATENT DOCUMENTS

2012/0098500 A1*  4/2012  Vestama et al. ............... 320/149

* cited by examiner

*Primary Examiner* — Thuan Do
(74) *Attorney, Agent, or Firm* — Tim Tingkang Xia, Esq.; Locke Lord LLP (57) ABSTRACT

The invention discloses an USB charger with electric power display of battery being charged and a method for electric power display of battery being charged in an electronic cigarette. The USB charger includes an USB interface, a battery unit and a charging control unit, and further includes an electric power display unit. The charging control unit, being separately connected to the USB interface, the battery unit and the electric power display unit, controls an external power supply charging a battery in the battery unit through the USB interface, tests voltage of the battery being charged directly or indirectly, and further controls the electric power display unit to show updated electric power of the battery being charged in real time to user who can know current charging state of the battery.

10 Claims, 5 Drawing Sheets

USB CHARGER WITH ELECTRIC POWER DISPLAY AND A METHOD FOR ELECTRIC POWER DISPLAY

CROSS-REFERENCE TO RELATED APPLICATIONS

This non-provisional application claims priority under 35 U.S.C. §119(a) on Patent Application No. 201310254475.9 filed in P.R. China on Jun. 24, 2013, the entire contents of which are hereby incorporated by reference.

BACKGROUND

1. Technical Field

The invention relates to a charger for an electronic cigarette, and more particularly relates to an USB charger with electric power display of a charging battery and a method for electric power display of the charging battery in the electronic cigarette.

2. Prior Art

Figure 1:
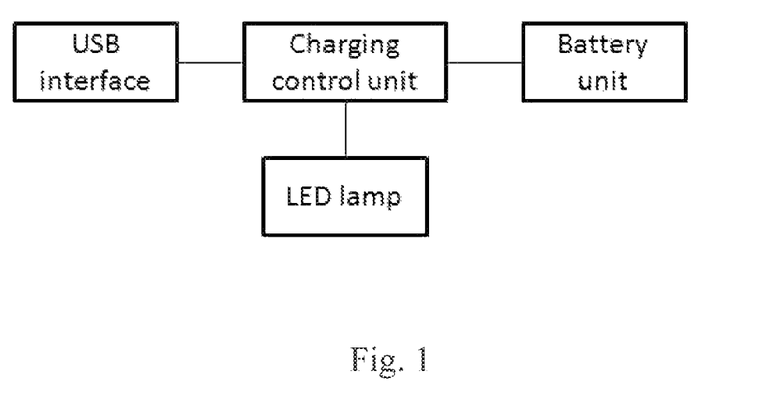
FIG. 1 illustrates a schematic diagram of a prior art USB charger having charging indication without electric power display of a battery being charged.

FIG. 1 is a structure schematic of the existing technology of a USB charger which only has charging indicator without electric power display.

Currently most of USB chargers for batteries in electronic cigarettes only have charging state indication of "charging" or "full" displayed by monochrome or color LED lamps, some USB chargers even have not charging state indication. Therefore user does not know electric power of the charging battery, it will cause inconvenience to user.

For example if an user smokes when the battery in the electronic cigarette has only been charged 10% electric power, may be after a few inhalation of smoke, the electronic cigarette run out electricity and does no work, it causes inconvenience to the user.

Therefore the defects of existing art need to be improved.

SUMMARY OF THE INVENTION

To resolve the technical problem for the electric power of the charging battery cannot be displayed, an USB charger with electric power display of a charging battery and method of electric power display are provided.

An USB charger with electric power display for battery being charged comprising:

an USB interface;
a battery unit;
a charging control unit; and
an electric power display unit.

The charging control unit is separately connected to the USB interface, the battery unit and the electric power display unit;

The charging control unit controls an external power supply charging a battery in the battery unit through the USB interface, tests voltage of the battery being charged directly or indirectly, and further controls the electric power display unit to show updated electric power of the battery being charged in real time.

In the USB charger with electric power display for battery being charged according to the invention, when the voltage of the battery being charged is measured directly, the charging control unit includes: a micro controller, a charging management circuit and a sampling voltage circuit, the battery unit includes the battery;

The USB interface is connected to the charging management circuit separately connected to the battery and the sampling voltage circuit, the sampling voltage circuit is connected to the micro controller separately connected to the charging management circuit and the electric power display unit; and Wherein, the micro controller controls the charging management circuit outputting charging voltage to the battery, the sampling voltage circuit detecting the voltage of the battery being charged, and the electric power display unit showing electric power of the battery being charged.

In the USB charger with electric power display for battery being charged according to the invention, when the voltage of the battery is measured indirectly, the charging control unit includes: a micro controller, an adjustable output DC-DC circuit, a sampling voltage circuit and a sampling current circuit, the battery unit includes a battery and a linear charging management circuit;

The USB interface is connected to the adjustable output DC-DC circuit separately connected to the linear charging management circuit and the sampling voltage circuit, the linear charging management circuit is connected to the battery connected to the sampling current circuit, the micro controller is separately connected to the sampling voltage circuit, the sampling current circuit, the adjustable output DC-DC unit and the electric power display unit; and Wherein, the micro controller controls: the sampling current circuit detecting actual charging current of the battery, the adjustable output DC-DC circuit outputting charging voltage to the battery unit to have the actual charging current of the battery equal to or slightly less than a preset constant charging current of the battery, the sampling voltage circuit detecting the charging voltage to the battery unit, and the electric power display unit showing electric power of the charging battery.

In the USB charger with electric power display for battery being charged according to the invention, wherein the electric power display unit includes LED lamp and/or LCD screen.

In the USB charger with electric power display for battery being charged according to the invention, the electric power is a charged level of the battery being charged, the electric power display unit includes at least 2 LED light indicating the charged level.

In the USB charger with electric power display for battery being charged according to the invention, the electric power includes percentage of full electric power of the battery being charged and spent charging time and/or surplus charging time, the electric power display unit includes at least one LCD screen indicating the electric power.

In the USB charger with electric power display for battery being charged according to the invention, the charging management circuit includes a charging control chip, a first capacitor and a first resistance, the charging control chip is connected to the USB interface via the first resistor, the charging control chip is also connected to one end of the first capacitor and the positive of the battery, another end of the first capacitor is connected to the negative of the battery.

In the USB charger with electric power display for battery being charged according to the invention, type of the charging control chip is VA7204, type of the micro controller is SN8P2712.

In the USB charger with electric power display for battery being charged according to the invention, the sampling voltage circuit includes a first divider resistor and a second divider resistor, one end of the first divider resistor is connected to the positive of the battery, another end of first divider resistor is connected to one end of the second divider resistor and PWM2 pin of the micro controller, another end of the second divider resistor is connected to the ground.

In the USB charger with electric power display for battery being charged according to the invention, type of the micro controller is SN8P2712.

In the USB charger with electric power display for battery being charged according to the invention, the adjustable output DC-DC circuit includes a MOSFET, a first capacitor, a first fast recovery diode, a first resistor and a second resistor, the source of the MOSFET is connected to the negative of the first fast recovery diode, the positive of the first fast recovery diode is connected to the USB interface via the first resistance; the gate of the MOSFET is connected to pin PWM0 of the micro controller via the second resistance; the drain of the MOSFET is connected to one end of the first capacitor and the linear charging management circuit, another end of the first capacitor is connected to the negative of the battery. In the USB charger with electric power display for battery being charged according to the invention, the MOSFET is P-channel and type of the MOSFET is AO3401.

In the USB charger with electric power display for battery being charged according to the invention, the sampling voltage circuit includes a first divider resistor and a second divider resistor, one end of the first divider resistor is connected to one end of the first capacitor, another end of first divider resistor is connected to one end of the second divider resistor and pin PWM2 of the micro controller, another end of the second divider resistor is connected to the ground.

In the USB charger with electric power display for battery being charged according to the invention, the sampling current circuit includes a sampling current resistor which is separately connected to pin PWM1 of the micro controller and the negative of the battery.

The invention also discloses a method for electric power display of USB charger with electric power display of battery being charged, a charging control unit controls external power supply charging the battery in a battery unit, directly or indirectly tests voltage of the battery being charged in the battery unit, and further controls an electric power display unit showing electric power of the battery being charged.

In the method for electric power display of USB charger with electric power display of battery being charged according to the invention, when directly testing a voltage of the charging battery, a micro controller controls: a charging management circuit outputting charging voltage to the battery, a sampling voltage circuit detecting voltage of the battery being charged, and the electric power display unit showing the electric power of the battery being charged.

In the method for electric power display of USB charger with electric power display of battery being charged according to the invention, when indirectly testing the voltage of the battery being charged, the micro controller controls: a sampling current circuit detecting actual charging current of the battery, an adjustable output DC-DC circuit outputting charging voltage to the battery unit to have the actual charging current of the battery equal to or slightly less than a preset constant charging current of the battery, and the sampling voltage circuit detecting the charging voltage to the battery unit.

The voltage of the battery being charged is equal to that the charging voltage to the battery unit minus a preset difference. The micro controller further controls the electric power display unit showing electric power of the battery being charged.

In the method for electric power display of USB charger with electric power display of battery being charged according to the invention, the electric power may be showed by way of columnar and/or fan-shaped and/or percentage.

Implementation of the USB charger and the method of the invention, following advantages can be achieved by controlling external power supply charging the battery in battery unit, directly or indirectly testing the voltage of the charging battery and showing updated electric power, user can know charging level of the battery.

BRIEF DESCRIPTION OF THE DRAWINGS

A more complete understanding of the invention may be derived by referring the detailed description when considered in connection with the Figures, and.

DETAIL DESCRIPTION OF THE INVENTION

Figure 2:
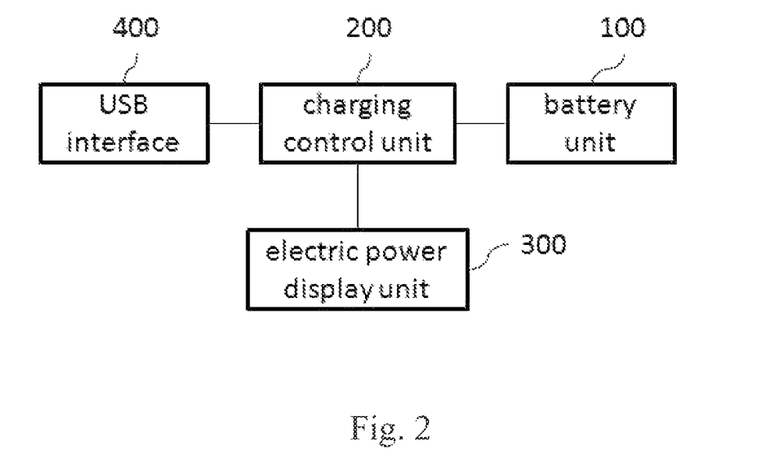
FIG. 2 illustrates a schematic block diagram of an USB charger with electric power display of the battery being charged according to the invention.

FIG. 2 is a schematic block diagram of an USB charger with electric power display of the battery being charged according to the invention. In FIG. 2, the USB charger includes the battery unit 100, the charging control unit 200, the electric power display unit 300, and the USB interface 400, the charging control unit 200 is separately connected to the USB interface 400, the battery unit 100 and the electric power display 300.

The charging control unit 200 controls external power supplies through the USB interface 400 charging a battery in battery unit 100, directly or indirectly testing a voltage of the charging battery and further controls the electric power display unit 300 showing updated electric power of the charging battery in real time.

The electric power display unit 300 includes LED lamp and/or LCD screen.

When the electric power display unit 300 only includes LED lamp, at least 2 LED lights is configured to show a charged level of the charging battery.

When the electric power display unit 300 only includes LCD screen, at least one LCD screen is configured to show percentage of full electric power of the charging battery and spent charging time and/or surplus charging time.

When the electric power display unit includes both LED light and LCD screen, at least 2 LED lights is configured to show a charged level of the charging battery and at least one LCD screen is configured to show percentage of full electric power of the charging battery and spent charging time and/or surplus charging time.

The charged level may be divided into several grades, the number of grades must be an integer which equal to the number of LED lamps of the electric power display unit 300, each grade corresponds to a certain voltage range of the charging battery and a certain number of LED lamps. For example if the voltage of the charging battery is in N grade, so N LED lamps shall emit to show the charged lever.

Figure 3:
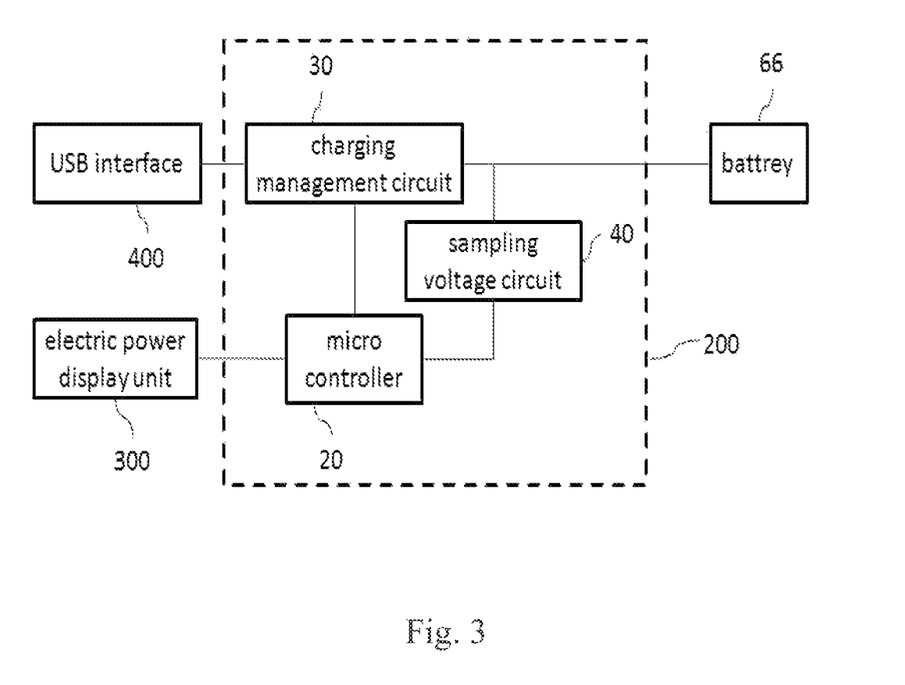
FIG. 3 illustrates a schematic block diagram of the USB charger with electric power display of the battery being charged according to a first embodiment of the invention.

FIG. 3 is a schematic block diagram of the USB charger with electric power display of the battery being charged according to a first embodiment of the invention. In FIG. 3, a battery unit of an electronic cigarette has not charging management circuit inside, the USB charger with a charging management circuit charges a battery in the battery unit, so the charging voltage from the USB charger to the battery unit is equal to the voltage of the charging battery of the battery unit, a micro controller can get electric power of the charging battery from the voltage of the charging battery.

Specifically, in the first embodiment, the battery unit 100 only includes the battery 66; the charging control unit 200 includes the micro controller 20, the charging management circuit 30, and the sampling voltage circuit 40.

The USB interface 400 is connected to the charging management circuit 30 connected to the battery 66 and the sampling voltage circuit 40, and the micro controller 20 is separately connected to the sampling voltage 40, the charging management circuit 30 and the electric power display unit 400.

The micro controller 20 controls the charging management circuit 30 outputting charging voltage to the battery 66, the sampling voltage circuit 40 detecting voltage of the battery 66 being charged, the electric power display unit 400 showing electric power of the battery 66 being charged.

The electric power display unit 300 is configured as LED lamps, and the electric power is showed by charged level.

Figure 4:
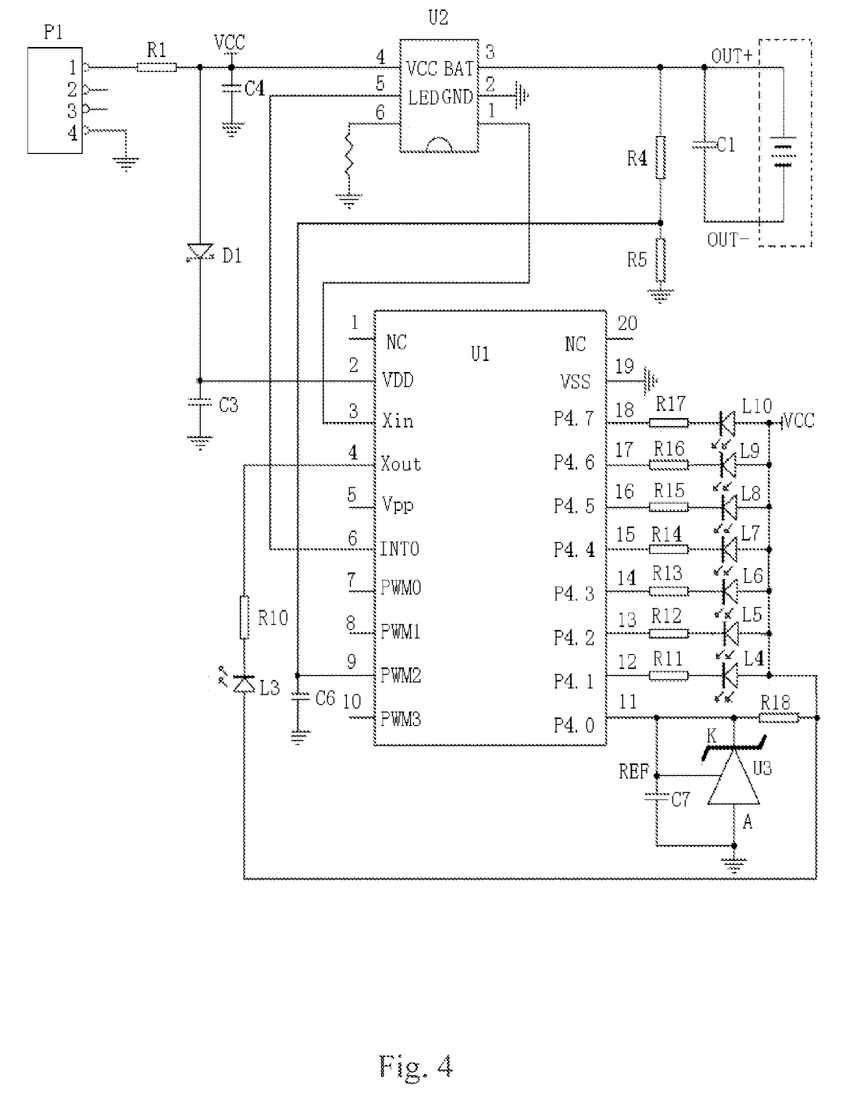
FIG. 4 illustrates a schematic circuit diagram of the USB charger with electric power display of the battery being charged according to the first embodiment of the invention.

FIG. 4 is a schematic circuit diagram of the USB charger with electric power display of the battery being charged according to the first embodiment of the invention. In FIG. 4, the charging management circuit 30 includes a control chip U2, a first capacitor c1, a first resistor R1, type of U2 is VA7204.

Pin 4 of the USB interface P1 is connected to the ground, pin 1 of the USB interface P1 is connected to one end of the capacitor C4 and pin 4 (VCC of test terminal) of the control chip U2 via the first resistor R1, another end of the capacitor C4 is connected to the ground.

Type of the micro controller U1 is SN8P2712, VDD pin of the micro controller U1 is connected to the negative of the fast recovery diode D1, the positive of the fast recovery diode D1 is connected to the VCC of test terminal, VDD pin of the micro controller U1 is connected to the ground via the capacitor C3, VSS pin of the micro controller U1 is connected to the ground, p4.0 pin of the micro controller U1 is connected to the capacitor C7, the resistor R18 and the adjustable precision shunt regulators U3, type of the U3 is CJ431. BAT pin of the control chip U2 is connected to one end of the first capacitor C1 and the positive of the battery 66, i.e. OUT+ terminal of the battery unit 100, another end of the first capacitor C1 is connected to the negative of the battery 66, i.e. OUT− terminal of the battery unit 100, INT0 pin of the micro controller U1 is connected to LED pin of the control chip U2.

The electric power display unit 300 includes eight blue LED lamps of L3 to L10 indicating the charged level.

Pins of p4.1 to p4.7 of the micro controller U2 are separately connected to the negatives of the blue LED lamps of L4 to L10 separately via the resistances of R11 to R17. Pin Xout of the micro controller U1 is connected to the negative of the blue LED lamp L3 via the resistance R10. The positives of the blue LED lamps L3-L10 are all connected to the VCC of test terminal. Each resistance value of the R10 to R17 is same as 2KΩ.

The sampling voltage circuit 40 includes the first divider resistance R4 and the second divider resistance R5. One end of the first divider resistance R4 is connected to the positive i.e. OUT+ of the battery unit 100, another end of the first divider resister R4 is connected to one end of the second divider resistance R5 and pin PWM2 of the micro controller U1, another end of the second divider resistance R5 is connected to the ground. Pin PWM2 of the micro controller U1 is connected to the ground via the capacitor C6. The resistance value of the first divider resistance R4 is 10 KΩ and is same as the resistance value of the second divider resistance R5.

Figure 5:
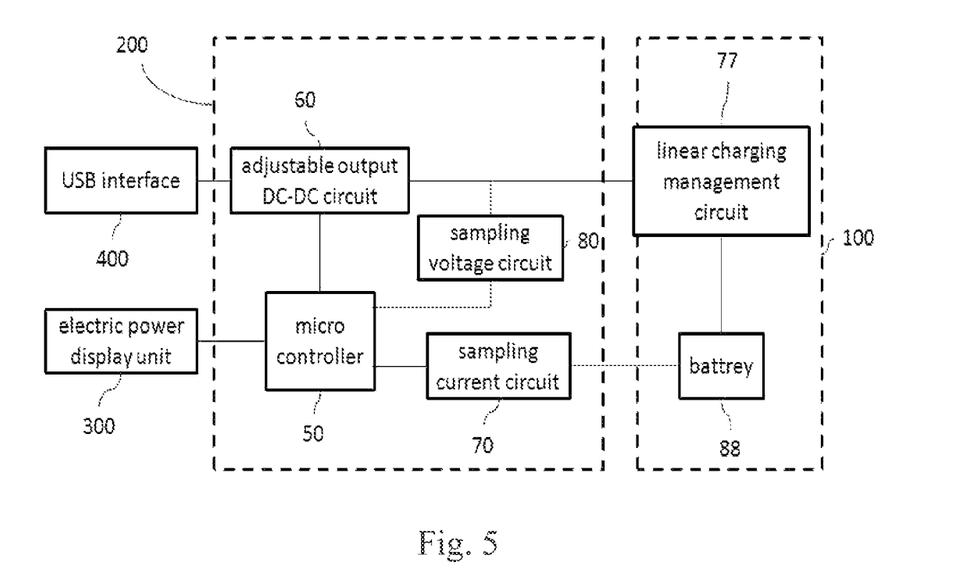
FIG. 5 illustrates a schematic block diagram of the USB charger with electric power display of the battery being charged according to a second embodiment of the invention.

FIG. 5 is a schematic block diagram of the USB charger with electric power display of the battery being charged according to a second embodiment of the invention. In FIG. 5, the battery pole of an electric cigarette, i.e. the battery unit 100, has the linear charging management circuit 77 inside, so only a fixed 5V voltage is needed to supply to the battery unit 100, but the voltage of the battery 88 being charged in the battery unit 100 can not be detected directly. The voltage of the batter 88 being charged can be got by following steps: controlling the adjusting output DC-DC circuit 212 outputting a charging voltage to the battery unit 100 to have the charging current through the battery 88 equal to or slight then a preset constant charging current of the battery 88, in this conditions, the voltage of the battery 88 being charged is equal to that the charging voltage to battery unit 100 minus a preset difference. In this embodiment, the preset difference is 0.2-0.5V, the preferred 0.2V. Further the electric power of the battery 88 is calculated.

Specifically the battery unit 100 includes the linear charging management circuit 77 and the battery 88, they are connected electrically.

The charging control unit 200 includes the micro controller 50, adjustable output DC-DC circuit 60, the sampling voltage circuit 80 and the sampling current circuit 70.

The USB interface 400 is connected to the adjustable output DC-DC circuit 60 connected to the linear charging management circuit 77 and the sampling voltage circuit 80. The sampling voltage circuit 80 is connected to the micro controller 50 connected to the sampling current circuit 70, the electric power display unit 300 and the adjustable output DC-DC circuit 60.

The linear charging management circuit 77 is connected to the battery 88 connected to the sampling current circuit 70.

The sampling current circuit 70 is used for detecting an actual charging current to the battery 88, the micro controller 50 compares the actual charging current with the preset constant charging current of the battery 88 and then controls the adjustable output DC-DC circuit 66 outputting an adjusted charging voltage to the battery unit 100 to make that the actual charging current to the battery 88 is equal to or slight then the preset constant charging current of the battery 88. The sampling voltage circuit 80 detects the charging voltage to battery unit 100, and transmits it to the micro controller 50, the micro controller 50 can calculate out the voltage of the battery 88 being charged, which is equal to that the charging voltage to the battery unit 100 minus a preset difference. Further the electric power of the battery 88 being charged can be showed.

In the second embodiment, the electric power display unit 300 is configured as LED lamps; the electric power of the charging battery is showed by charged level.

The second embodiment has two modes of execution.

Figure 6:
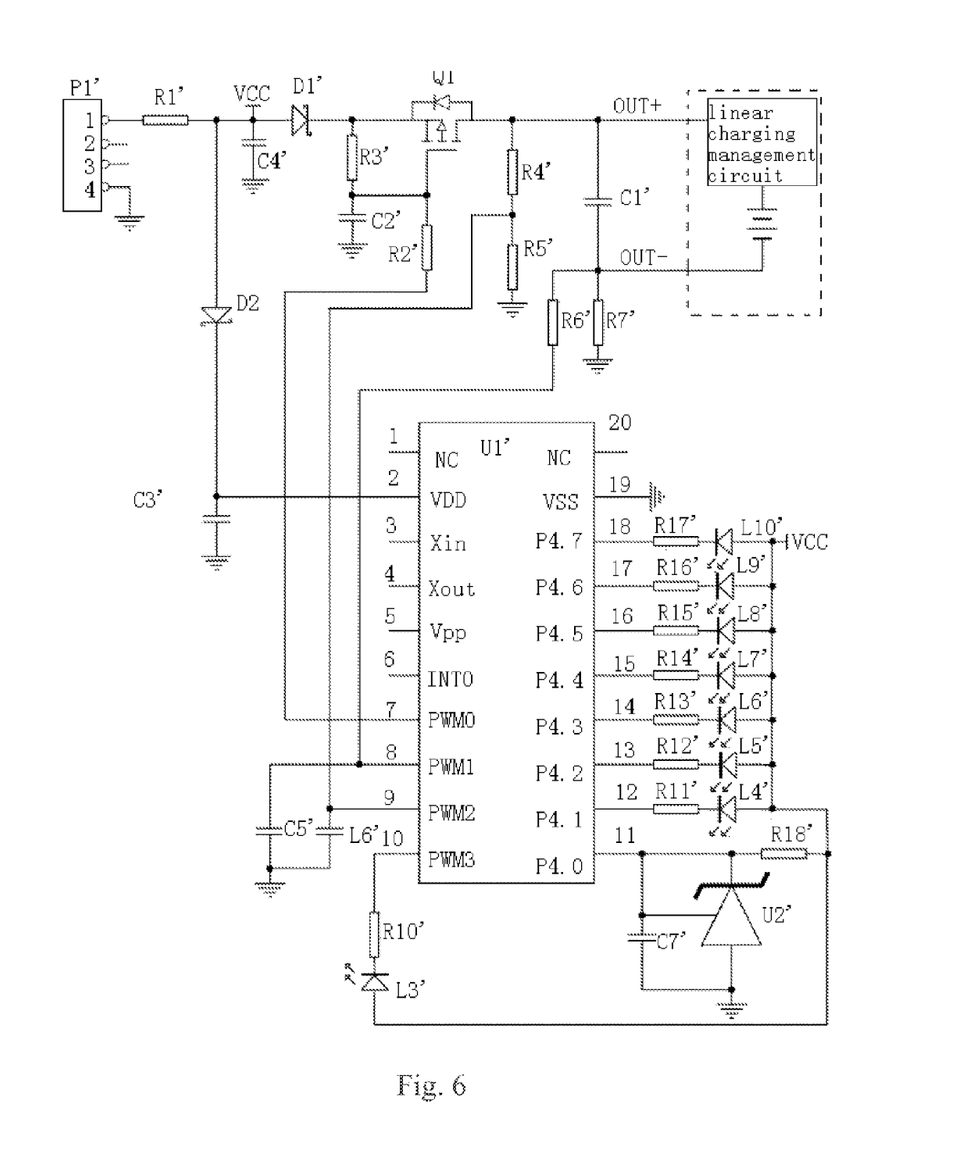
FIG. 6 illustrates a schematic circuit diagram of the USB charger with electric power display of the battery being charged according to a first mode of the second embodiment of the invention.

FIG. 6 is a schematic circuit diagram of the USB charger with electric power display of the battery being charged according to a first mode of the second embodiment of the invention. In FIG. 6, the adjustable output DC-DC circuit 60 includes: a MOS FET Q1, a first capacitor C1', a first recovery diode D1', a first resistance R1' and a second resistance R2'.

Pin 4 of the USB P1' interface is connected to the ground, pin 1 of the USB P1' interface is connected to the VCC of test terminal and one end of the capacitor C4' via the first resistance R1', and another end of the capacitor C4' is connected to the ground.

Type of the micro controller U1' is SN8P2712, pin VDD of the micro controller U1' is connected to the negative of the fast recovery diode D2 and is connected to ground via the capacitor C3', the positive of the fast recovery diode D2 is connected to the VCC of test terminal, pin VSS of the micro controller U1' is connected to the ground, and pin P4.0 of the micro controller U1' is connected to the capacitor C7', the resistance R18', and the adjustable precision shunt regulators U2' of type CJ 431.

The source of the MOSFET Q1 is connected to the negative of the first fast recovery diode D1', and is connected to one end of the capacitor C2' and the gate of the MOSFET Q1 via the resistance R3'. Another end of the capacitor C2' is connected to the ground, the positive of the first fast recovery diode D1' is connected to the VCC of test terminal; the gate of the MOSFET Q1 is connected to pin PWM0 of micro controller U1' via the second resistance R2'; the drain of the MOSFET Q1 is connected to one end of the first capacitor C1' and the linear charging management circuit 77 and the OUT+ terminal of the battery unit 100, another end of the first C1' is connected to the negative of the battery 88 and the OUT− terminal of the battery unit 100. The OUT+ and OUT− terminals is configured as the positive and negative of the battery unit 100 when outputting power supply to external.

Pin PWM0 of the micro controller U1' is used to output adjustable PWM signal to control the MOSFET Q1 turn-on and turn-off, and further control charging time of the first capacitor C1' to achieve real-time adjustment of the charging voltage objective.

Type of MOSFET Q1 is AQ3401, P channel. Types of all referred fast recovery diodes are same as SS14.

The electric power display unit 300 includes eight blue LED lamps L3' to L10' indicating the charged level of the charging battery.

Pins of p4.1 to p4.7 of the micro controller U1' are separately connected to the negatives of the blue LED lamps of L4' to L10' via the resistances of R11' to R17'. Pin PWM3 of the micro controller U1' is connected to the negative of the blue LED lamp L3 via the resistance R10'. The positives of the blue LED lamps L3'-L10' are all connected to the VCC of test terminal. Each resistance value of the R10' to R17' is same as 2KΩ.

The sampling voltage circuit 80 includes the first divider resistance R4' and the second divider resistance R5', one end of the first divider resistance R4' is connected to one end of the first capacitor C1' and OUT+ terminal of the battery unit 100, another end of the first divider resister R4' is connected to one end of the second divider resistance R5' and pin PWM2 of the micro controller U1', another end of the second divider resistance R5 is connected to the ground. Pin PWM2 of the micro controller U1 is connected to the ground via the capacitor C6'. The resistance value of the first divider resistance R4' is 10KΩ as same as the second divider resistance R5'.

The sampling current circuit 70 includes a sampling current resistance R6' with resistance value of 1KΩ. One end of the sampling current resistance R6' is connected to pin PWM1 of the micro controller U1', another end of the sampling current resistance R6' is connected to the negative of the battery 88 and the OUT− terminal of the battery unit 100. One end of the resistance R7' is connected to the OUT− terminal of the battery unit 100, another end of the resistance R7' is connected to the ground. Pin PWM1 of the micro controller U1' is connected to the ground via the capacitor C5.

In a second mode of the second embodiment of the invention, the adjustable output DC-DC circuit 60 includes a digital potentiometer and DC-DC output circuit. The digital potentiometer is used to adjust the resistance value of a feedback resistance of the DC-DC output circuit, and make the DC-DC output circuit adjust a charging voltage to the battery unit 100. This technology of the digital potentiometer is well known in the field, here don't do detailed.

There is provided an electric power display method for an USB charger with electric power display of a charging battery according the invention. The method is that: the charging control unit 200 controls external power supply charging a battery in the battery unit 100, directly or indirectly tests voltage of the battery being charged in battery unit 100, and further controls the electric power display unit 300 showing electric power of the battery being charged.

When directly tests voltage of the battery being charged, the micro controller 20 controls: the charging management circuit 30 outputting charging voltage to the battery 66, the sampling voltage circuit 40 detecting voltage of the battery 66 being charged, and the electric power display unit 300 showing the electric power of the battery 66 being charged.

When indirectly tests voltage of the battery being charged, the micro controller 50 controls: the sampling current circuit 70 detecting actual charging current of the battery 88, the adjustable output DC-DC circuit 60 outputting charging voltage to the battery unit 100 to have the actual charging current of the battery 88 equal to or slightly less than a preset constant charging current of the battery 88, and the sampling voltage circuit 80 detecting the charging voltage to the battery unit 100.

The voltage of the battery being charged is equal to that the charging voltage to the battery unit 100 minus a preset difference. The micro controller further controls the electric power display unit 300 showing electric power of the battery 88 being charged.

The electric power may be showed by way of columnar and/or fan-shaped and/or percentage.

The voltage sampling frequency is one time per second.

The electric power display further includes:

The electric power of the battery being charged may be divided into N grades, full charged level of the battery being charged is corresponding to the N grade, a charged level of the battery being charged is corresponding to a number of lattices of the column or fan-shaped display.

While the invention has been described by way of example and in terms of preferred embodiment, it is to be understood that the invention is not limited thereto. Those who are skill in this technology can still make various alterations and modifications without departing from the scope of the invention. Therefore, the scope of the present invention shall be defined and protected by the following claims and their equivalents.

What is claimed is:

1. An USB charger with electric power display for battery being charged, comprising:
   an USB interface;
   a battery unit;
   a charging control unit; and
   an electric power display unit;
   wherein, the charging control unit is separately connected to the USB interface, the battery unit and the electric power display unit;
   the charging control unit controls an external power supply charging a battery in the battery unit through the USB interface, tests voltage of the battery being charged directly, and further controls the electric power display unit to show updated electric power of the battery being charged in real time;

the charging control unit includes: a micro controller, a charging management circuit and a sampling voltage circuit, and the battery unit includes the battery;

the USB interface is connected to the charging management circuit separately connected to the battery and the sampling voltage circuit, the sampling voltage circuit is connected to the micro controller separately connected to the charging management circuit and the electric power display unit;

the micro controller controls the charging management circuit outputting charging voltage to the battery, the micro controller further controls the sampling voltage circuit detecting the voltage of the battery being charged, and the electric power display unit showing electric power of the battery being charged;

the charging management circuit includes a charging control chip, a first capacitor and a first resistance, the charging control chip is connected to the USB interface via the first resistor, the charging control chip is also connected to one end of the first capacitor and the positive of the battery, another end of the first capacitor is connected to the negative of the battery; and type of the charging control chip is VA 7204, type of the micro controller is SN8P2712.

2. The USB charger with electric power display for battery being charged as claimed in claim 1 wherein the electric power display unit includes LED lamp and/or LCD screen.

3. The USB charger with electric power display for battery being charged as claimed in claim 1 wherein the electric power is a charged level of the battery being charged, the electric power display unit includes at least 2 LED lamps indicating the charged level.

4. The USB charger with electric power display for battery being charged as claimed in claim 1 wherein the electric power includes percentage of full electric power of the battery being charged and spent charging time and/or surplus charging time, the electric power display unit includes at least one LCD screen indicating the electric power.

5. The USB charger with electric power display for battery being charged as claimed in claim 1 wherein the sampling voltage circuit includes a first divider resistor and a second divider resistor, one end of the first divider resistor is connected to the positive of the battery, another end of first divider resistor is connected to one end of the second divider resistor and PWM2 pin of the micro controller, another end of the second divider resistor is connected to the ground.

6. An USB charger with electric power display for battery being charged, comprising
an USB interface;
a battery unit;
a charging control unit; and
an electric power display unit;
wherein, the charging control unit is separately connected to the USB interface, the battery unit and the electric power display unit;
the charging control unit controls an external power supply charging a battery in the battery unit through the USB interface, tests voltage of the battery being charged indirectly, and further controls the electric power display unit to show updated electric power of the battery being charged in real time;

the charging control unit includes: a micro controller, an adjustable output DC-DC circuit, a sampling voltage circuit and a sampling current circuit, the battery unit includes a battery and a linear charging management circuit;

the USB interface is connected to the adjustable output DC-DC circuit separately connected to the linear charging management circuit and the sampling voltage circuit, the linear charging management circuit is connected to the battery connected to the sampling current circuit, the micro controller is separately connected to the sampling voltage circuit, the sampling current circuit, the adjustable output DC-DC unit and the electric power display unit;

the micro controller controls: the sampling current circuit detecting actual charging current of the battery, the adjustable output DC-DC circuit outputting charging voltage to the battery unit to have the actual charging current of the battery equal to or slightly less than a preset constant charging current of the battery; the micro controller further controls the sampling voltage circuit detecting the charging voltage to the battery unit, and the electric power display unit showing electric power of the charging battery; and type of the micro controller is SN8P2712.

7. The USB charger with electric power display for battery being charged as claimed in claim 6 wherein the adjustable output DC-DC circuit includes a MOSFET, a first capacitor, a first fast recovery diode, a first resistor and a second resistor, the source of the MOSFET is connected to the negative of the first fast recovery diode, the positive of the first fast recovery diode is connected to the USB interface via the first resistor; the gate of the MOSFET is connected to pin PWMO of the micro controller via the second resistance; the drain of the MOSFET is connected to one end of the first capacitor and the linear charging management circuit, another end of the first capacitor is connected to the negative of the battery.

8. The USB charger with electric power display for battery being charged as claimed in claim 7 wherein the MOSFET is P-channel and type of the MOSFET is A03401.

9. The USB charger with electric power display for battery being charged as claimed in claim 8 wherein the sampling voltage circuit includes a first divider resistor and a second divider resistor, one end of the first divider resistor is connected to one end of the first capacitor, another end of first divider resistor is connected to one end of the second divider resistor and pin PWM2 of the micro controller, another end of the second divider resistor is connected to the ground.

10. The USB charger with electric power display for battery being charged as claimed in claim 6 wherein the sampling current circuit includes a sampling current resistor which is separately connected to pin PWM1 of the micro controller and the negative of the battery.

* * * * *